United States Patent
Chou et al.

(10) Patent No.: US 8,112,809 B2
(45) Date of Patent: Feb. 7, 2012

(54) METHOD AND SYSTEM FOR LOCALLY ACTIVATING A DRM ENGINE

(75) Inventors: Chi-Yang Chou, Kao-hsiung (TW); Pei-Yen Chou, Hsin-chu (TW); Yeu-Chung Lin, Chang-hua (TW)

(73) Assignee: Condel International Technologies Inc., George Town (KY)

( * ) Notice: Subject to any disclaimer, the term of this patent is extended or adjusted under 35 U.S.C. 154(b) by 875 days.

(21) Appl. No.: 12/173,206

(22) Filed: Jul. 15, 2008

(65) Prior Publication Data

US 2010/0017882 A1 Jan. 21, 2010

(51) Int. Cl.
*G06F 7/04* (2006.01)
(52) U.S. Cl. .......................................... 726/26
(58) Field of Classification Search ............ 726/26, 726/4, 30; 713/165, 166, 189, 193, 167
See application file for complete search history.

(56) References Cited

U.S. PATENT DOCUMENTS

| | | | |
|---|---|---|---|
| 7,620,685 B2* | 11/2009 | Marcjan | 709/204 |
| 7,711,959 B2* | 5/2010 | Schmidt et al. | 713/181 |
| 7,861,312 B2* | 12/2010 | Lee et al. | 726/27 |
| 7,979,700 B2* | 7/2011 | Elazar et al. | 713/165 |
| 8,009,831 B2* | 8/2011 | Chou et al. | 380/44 |
| 2005/0204405 A1* | 9/2005 | Wormington et al. | 726/27 |
| 2010/0205457 A1* | 8/2010 | Jogand-Coulomb et al. | 713/189 |

* cited by examiner

*Primary Examiner* — Beemnet Dada
(74) *Attorney, Agent, or Firm* — Thomas|Kayden

(57) ABSTRACT

A method for locally activating a DRM engine is disclosed. A preprocessing operation is performed, wherein rights objects are bound with digital content files with a first format. The digital content files with the first format are converted to the digital content files with a second format. The digital content files with the second format file are encrypted and a corresponding decryption key is generated. The encrypted digital content files and the decryption key are stored in a memory device. An application is designed and installed on the electronic device and the memory device is installed to the electronic device. The application is authorized according to the rights objects bound in the digital content files, decrypts the encrypted digital content files using the decryption key, wherein the digital content files with the second format can be recovered from the third format, and activates a DRM engine of the electronic device. The DRM engine binds an IMEI code of the electronic device with the digital content files, enabling the digital content files to only be accessed by the specific electronic device.

17 Claims, 5 Drawing Sheets

METHOD AND SYSTEM FOR LOCALLY ACTIVATING A DRM ENGINE

BACKGROUND OF THE INVENTION

1. Field of the Invention

The invention relates to data encryption and decryption, and more particularly to a method and system for locally activating a DRM engine.

2. Description of the Related Art

Data delivery comprises on-line delivery and off-line delivery. The on-line delivery process downloads digital content via the internet. The off-line delivery process preloads digital content in a specific storage medium, such as a compact disc (CD), a digital versatile disc (DVD), or a flash memory device (like a secure digital (SD) card or a universal serial bus (USB) disc) of a portable electronic device (such as a mobile phone).

The off-line delivery process can be protected using a Content Scrambling System (CSS) for DVDs and a Content Protection for Recordable Media (CPRM) or a Content Protection for Pre-recorded Media (CPPM) for SD cards and DVD-RW.

Digital content must be processed using a digital rights management (DRM) system to be protected from illegal use or pirating.

FIG. 1 is a flowchart of a conventional method for DRM processing.

Preprocessed digital content files are stored in a file server on the internet (step S11). For an authorized user, permissions or rights objects are acquired, wherein the preprocessed digital content files are downloaded and stored in an electronic device (such as a personal computer or a mobile phone) (step S12), and a DRM engine of the electronic device is triggered (step S13). Each of the preprocessed digital content files are bound with the rights objects and an International Mobile Equipment Identification (IMEI) code of the electronic device (step S14) and converted into a new file format using the DRM engine (step S15), which can only be accessed by the specific application.

The described method is applied to the Open Mobile Alliance (OMA) DRM process, the Windows Media DRM for Network Device (WMDRM-ND) process, and the Apple FairPlay™ process. With respect to the OMA DRM process, the original digital content files are provided with a file format, such as .3gp, .mp3, or the like. The OMA DRM process performs a preprocessing operation, such that the digital content files with the .3gp format are converted to the digital content files with the .dm format, representing DRM material files, and the digital content files with the .dm format are stored in a file server to be downloaded. When a user purchases the digital content files and receives rights objects (i.e. the digital content files), the digital content files with the .dm format are downloaded and stored in an electronic device owned by the user. A DRM engine of the electronic device binds the rights objects with an IMEI code of the electronic device and converts the digital content files with the .dm format to the digital content files with the .dcf format representing DRM Content Format files. Thus, the processed digital content files with the .dcf format can only be accessed by the electronic device or other specific electronic devices.

However, the described method can only be applicable to on-line transmissions and may violate Traditional Rights and Usage (TRU) of the digital content files for the user.

FIG. 2 is a flowchart of another conventional method for DRM processing.

Preprocessed digital content files are stored in an embedded memory of an electronic device such that the preprocessed files are encrypted (step S21). Rights objects for the digital content files are downloaded through a network (the internet, for example) (step S22) and are stored in the electronic device (step S23) and a DRM engine of the electronic device is triggered (step S24). The DRM engine decrypts the preprocessed digital content files (step S25), binds the rights objects and an IMEI code of the electronic device with each of the decrypted digital content files (step S26), and converts the digital content files into a new file format (step S27).

Thus, the converted digital content files can only be accessed by the electronic device, for example, the .asf (Advanced System Format) files accessed by the Windows Media DRM for Portable Devices (WMDRM-PD). The described method can be applicable to portable electronic devices and the rights objects are required to be separately transmitted, slightly enhancing security versus the previously mentioned method, but still reliant on network transmissions.

FIG. 3 is a flowchart of another conventional method for DRM processing.

An exclusive DRM engine or a DRM system is designed by the content owner himself (step S31). The digital content files are preprocessed and converted into a file format which can only be recognized by the exclusive DRM engine or the DRM system (step S32). Thus, the digital content files can only be accessed by an electronic device comprising the exclusive DRM engine or the DRM system (step S33). The described method may result in considerable workload, occupying a lot of memory space, compatibility issues between the DRM engine or the DRM system and an operating system of the electronic device, and distrust by content providers.

BRIEF SUMMARY OF THE INVENTION

Methods for locally activating a DRM engine are provided. An exemplary embodiment of a method for locally activating a DRM engine applied to an electronic device comprises the following. A preprocessing operation is performed, wherein rights objects are bound with digital content files with a first format. The digital content files with the first format are converted to the digital content files with a second format. The digital content files with the second format file are encrypted and a corresponding decryption key is generated. The encrypted digital content files and the decryption key are stored in a memory device. An application is designed to perform authorization, file decryption, DRM engine activation, and security control. The application is installed on the electronic device and the memory device is installed to the electronic device. The application is authorized according to the rights objects bound in the digital content files. The application decrypts the encrypted digital content files using the decryption key, wherein the digital content files with the second format can be recovered from the third format. The application activates a DRM engine of the electronic device. The DRM engine binds an IMEI code of the electronic device with the digital content files, enabling the digital content files to only be accessed by the specific electronic device.

Systems for locally activating a DRM engine are provided. An exemplary embodiment of a system for locally activating a DRM engine comprises a memory device and an electronic device. The memory device provides a memory position to store digital content files encrypted using an encryption method and a decryption key. The electronic device provides an application and a DRM engine, wherein the application is design to perform authorization, file decryption, DRM engine activation, and security control. When the memory device is installed to the electronic device, the application is authorized according to rights objects bound in the digital content files, decrypts the encrypted digital content files using the decryption key, wherein the digital content files with a first format is converted into a second format, and activates the DRM engine. The DRM engine converts the digital content files with the second format to the third format and binds an IMEI code of the electronic device with the digital content files, enabling the digital content files to only be accessed by the electronic device.

A detailed description is given in the following embodiments with reference to the accompanying drawings.

BRIEF DESCRIPTION OF THE DRAWINGS

The invention can be more fully understood by reading the subsequent detailed description and examples with references made to the accompanying drawings, wherein.

DETAILED DESCRIPTION OF THE INVENTION

Figure 1:
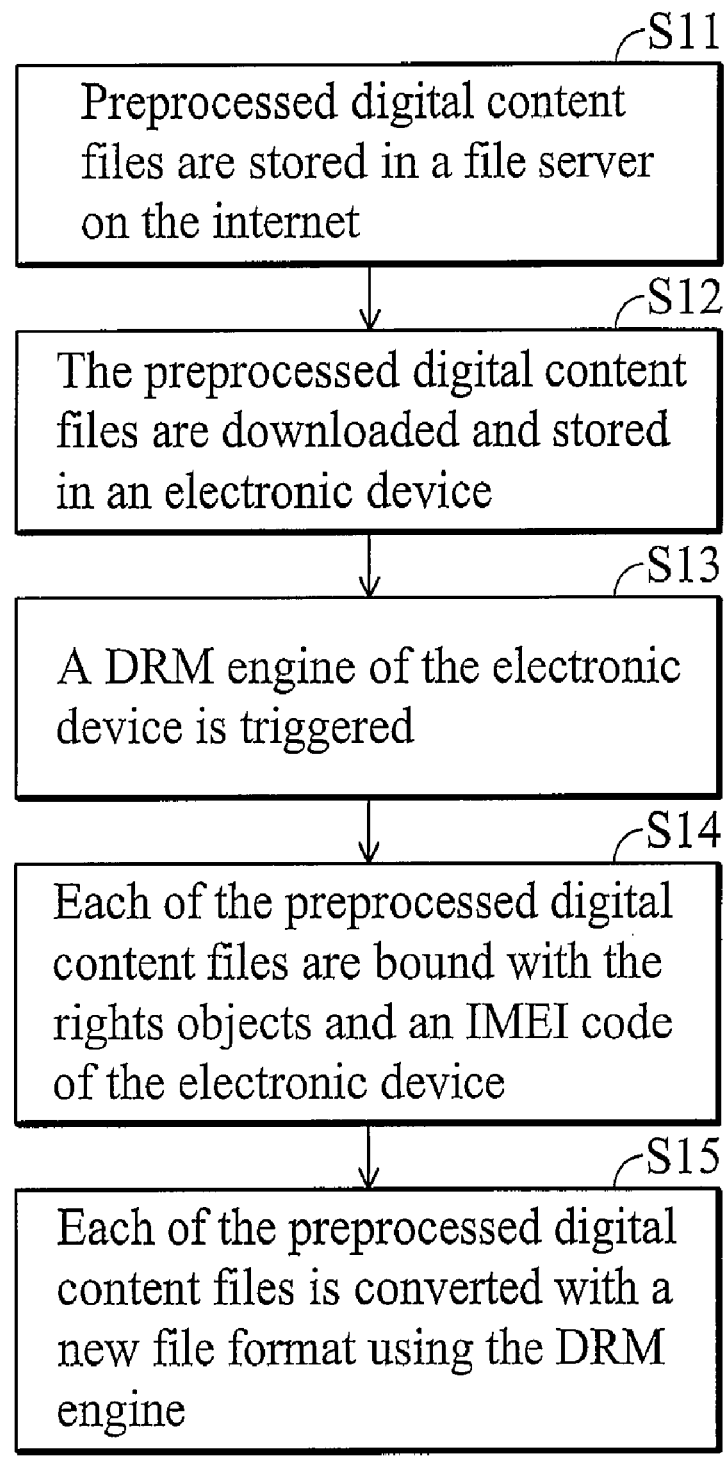
FIG. 1 is a flowchart of a conventional method for DRM processing.
Figure 2:
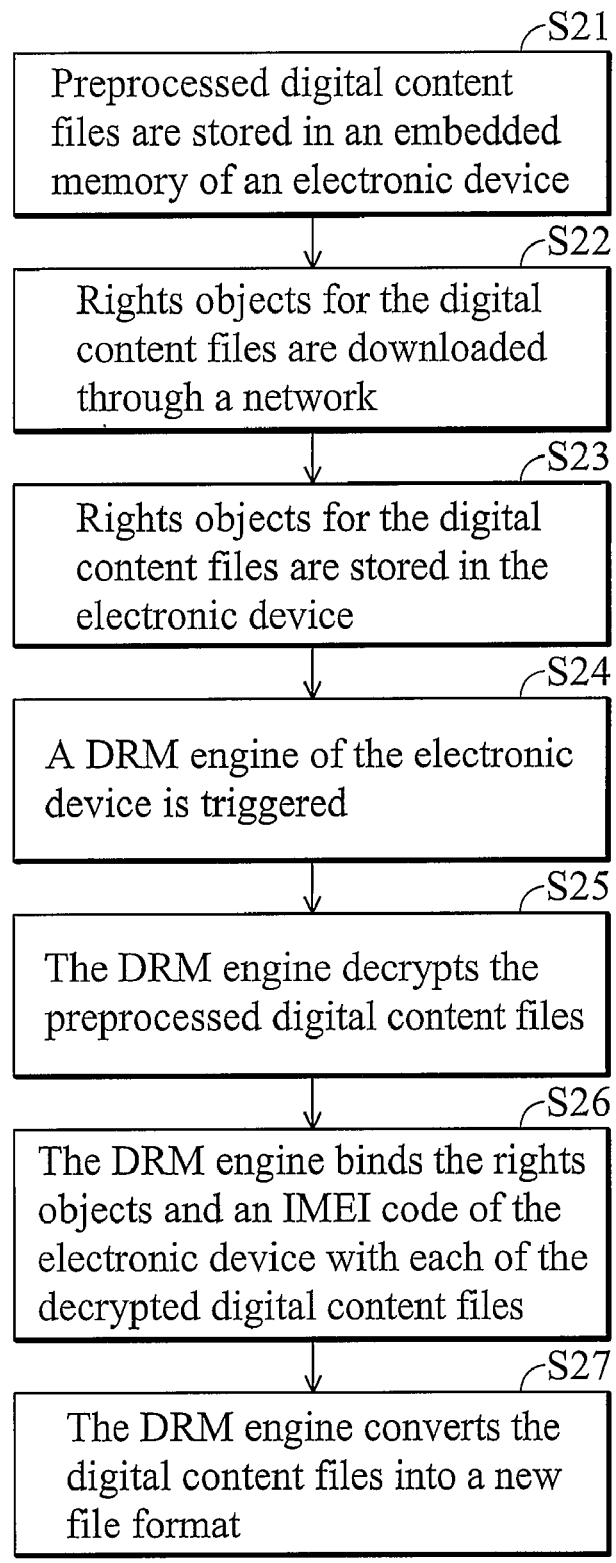
FIG. 2 is a flowchart of another conventional method for DRM processing.
Figure 3:
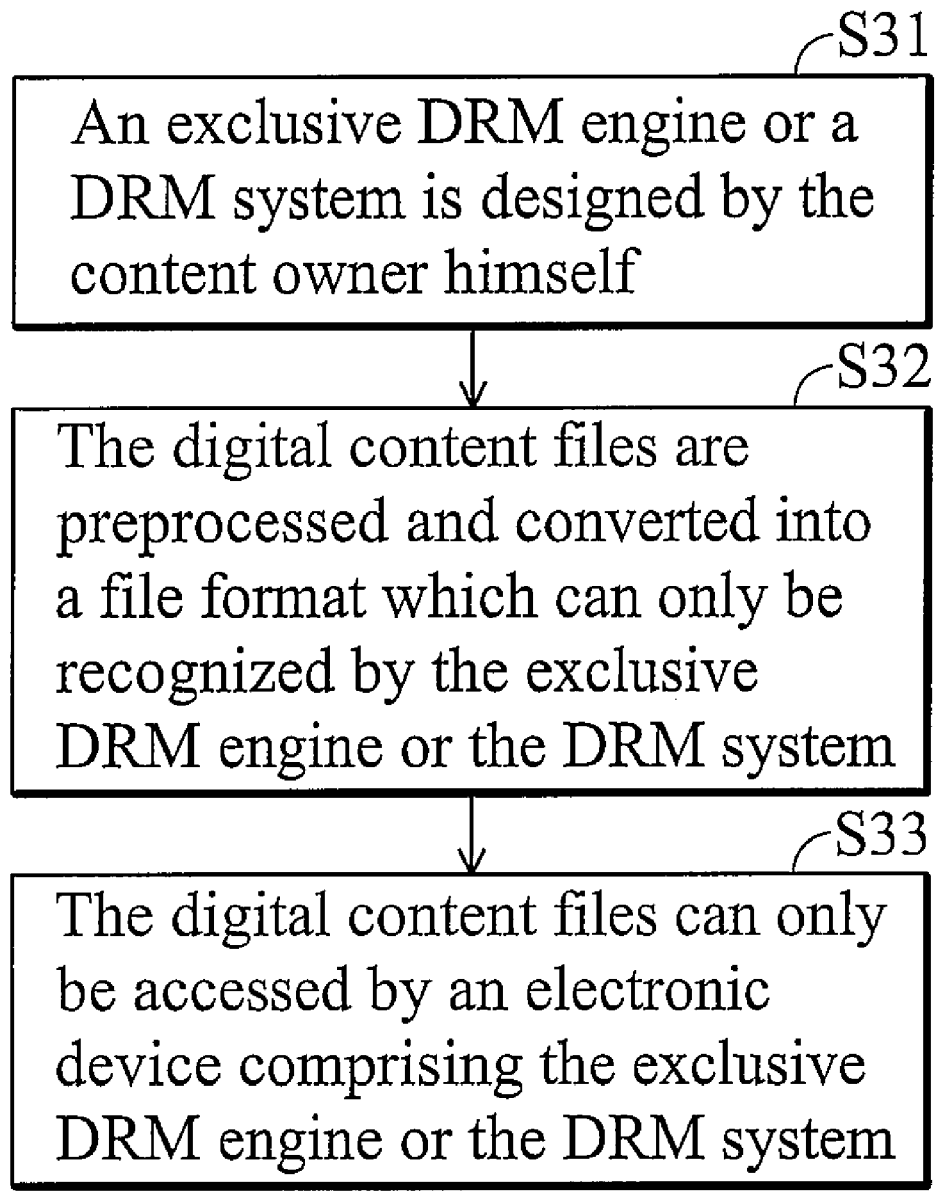
FIG. 3 is a flowchart of another conventional method for DRM processing.

Several exemplary embodiments of the invention are described with reference to FIGS. 4 through 5, which generally relate to locally activating a DRM engine. It is to be understood that the following disclosure provides various different embodiments as examples for implementing different features of the invention. Specific examples of components and arrangements are described in the following to simplify the present disclosure. These are, of course, merely examples and are not intended to be limiting. In addition, the present disclosure may repeat reference numerals and/or letters in the various examples. This repetition is for the purpose of simplicity and clarity and does not in itself dictate a relationship between the various described embodiments and/or configurations.

The invention discloses a method and system for locally activating a DRM engine.

An embodiment of the method and system for locally activating a DRM engine is applied to a portable flash memory device, such as a flash memory card or a USB mobile disc, for creating a DRM mechanism separate from a network system. The DRM mechanism is enabled using a DRM engine of an electronic device to overcome compatibility issues between the DRM engine and an operating system of the electronic device.

Figure 4:
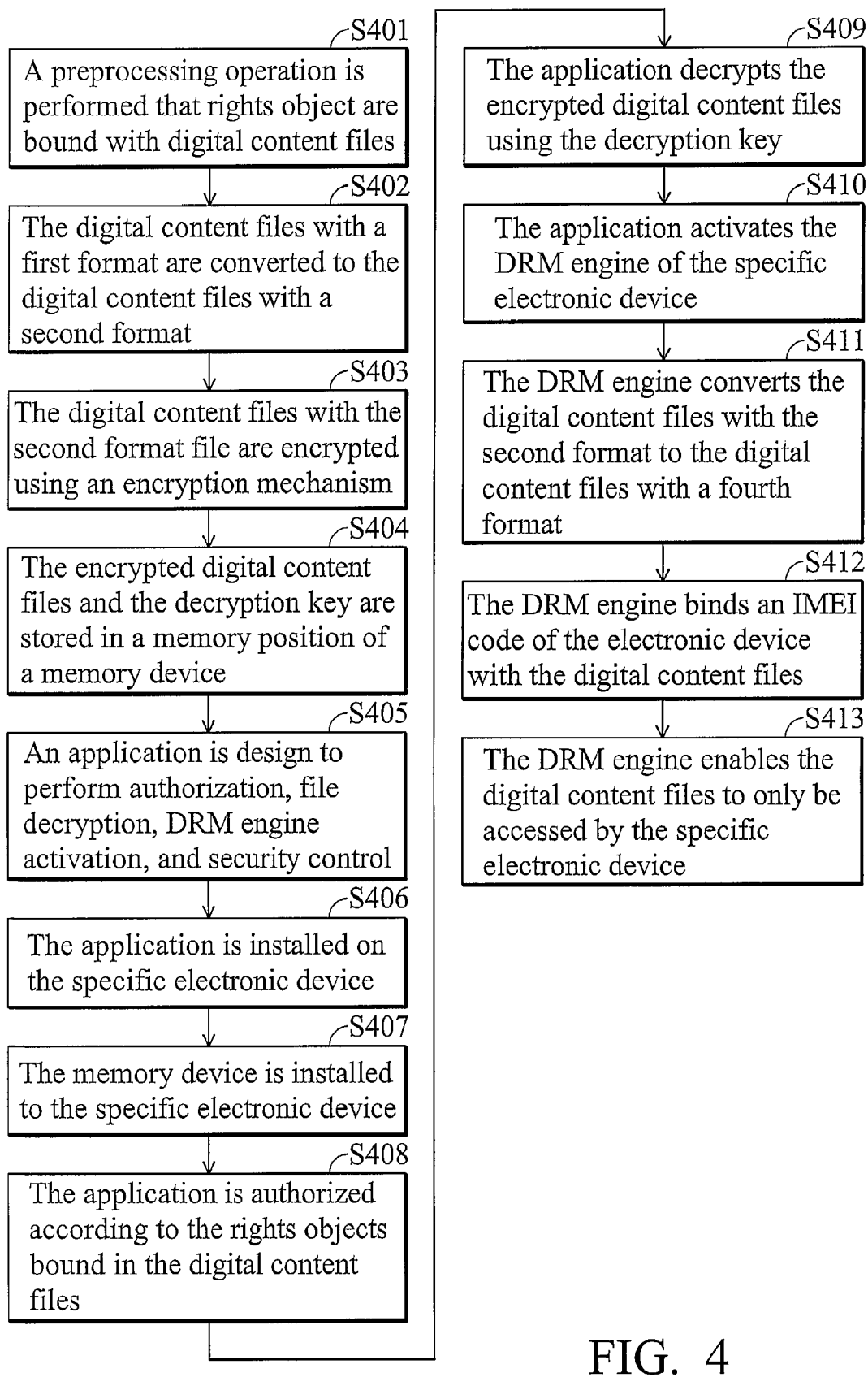
FIG. 4 is a flowchart of a method for locally activating a DRM engine of the present invention.

FIG. 4 is a flowchart of a method for locally activating a DRM engine of the present invention.

A preprocessing operation is performed, wherein rights object are bound with digital content files (step S401) and the digital content files with a first format (.3gp for OMA, for example) are converted to the digital content files with a second format (.dm for Open Mobile Alliance (OMA) DRM version 1.0, for example) (step S402) which can only be recognized by a DRM engine of a specific electronic device. For example, a DRM Packager for OMA 1.0 developed by SONY-Ericsson converts original digital content files to .dm format that rights objects are bound with the digital content files, so that the digital content files with the .dm format cannot be accessed by a general electronic device.

The digital content files with the second format file may be decrypted if downloaded from a file server. Thus, the digital content files with the second format file are encrypted using an encryption mechanism (such as an Advanced Encryption System (AES), 3 Data Encryption System (3DES), Twofish, and the like), wherein the digital content files with the second format file are converted to the digital content files with a third format file (.aes, for example), while a corresponding decryption key is generated (step S403).

The encrypted digital content files and the decryption key are stored in a memory position (a hidden area, for example) of a memory device (an SD card, for example) (step S404). The decryption key can also be dispersedly stored in the memory device or in the DRM engine to be unrecognized for enhanced protection. An application is designed using a program language (C++, for example) to perform authorization, file decryption, DRM engine activation, and security control (step S405) and installed on the specific electronic device (step S406). When the memory device is installed to the specific electronic device (step S407), the application is authorized according to the rights objects bound in the digital content files (step S408). The rights objects could be a verification code for the digital content files or a unique serial number of the memory device or the electronic device.

When authorization is successful, the application decrypts the encrypted digital content files using the decryption key, wherein the digital content files with the second format (.dm) is recovered from the third format (.aes) (step S409), and locally activates the DRM engine of the specific electronic device (step S410). The DRM engine converts the digital content files with the second format (.dm) to the digital content files with a fourth format (.dcf) (step S411) and binds an IMEI code of the electronic device with the digital content files (step S412), enabling the digital content files to only be accessed by the specific electronic device (step S413).

It is noted that the application performs the security control to delete the decrypted digital content files when a memory device is removed from the electronic device or the electronic device is disabled before the DRM engine thereof is activated.

Figure 5:
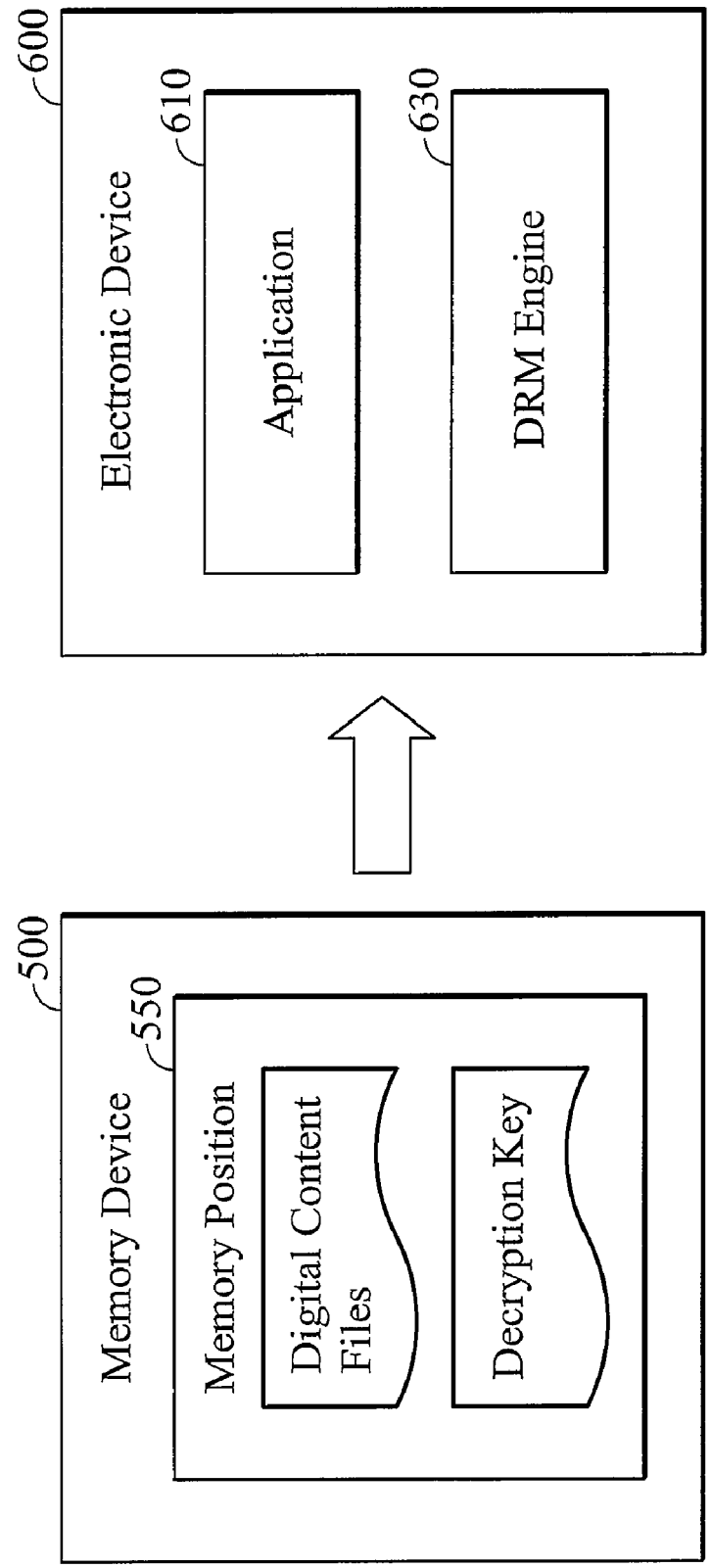
FIG. 5 is a schematic view of a system for locally activating a DRM engine of the present invention.

FIG. 5 is a schematic view of a system for locally activating a DRM engine of the present invention.

The system comprises a memory device 500 and an electronic device 600. The electronic device 600 provides an application 610 and a DRM engine 630. The memory device 500 provides a memory position 550 (a hidden area, for example) to store digital content files encrypted using an encryption method and a decryption key. The file format of the encrypted digital content files may be .aes if processed using the AES.

The application 610 is designed using a program language (C++, for example) to perform authorization, file decryption, DRM engine activation, and security control. When the memory device 500 is installed to the electronic device 600, the application 610 is authorized according to rights objects bound in the digital content files. The rights objects could be a verification code for the digital content files or a unique serial number of the memory device.

When authorization is successful, the application 610 decrypts the encrypted digital content files using the decryption key, wherein the digital content files with the .aes format is converted into the .dm format, and activates the DRM engine 630. The DRM engine 630 converts the digital content files with the .dm format to the .dcf format and binds an IMEI code of the electronic device 600 with the digital content files, enabling the digital content files to only be accessed by the electronic device 600.

An embodiment of the method and system for locally activating a DRM engine is applicable to off-line transmission for portable electronic devices or portable flash memory devices, providing off-line transmission of digital content files and corresponding DRM without use of the network. Further, the method provide a self-designed application to activate a DRM engine of a specific electronic device, overcoming compatibility issues between the DRM engine and an operating system of the specific electronic device.

Methods and systems of the present disclosure, or certain aspects or portions of embodiments thereof, may take the form of a program code (i.e., instructions) embodied in media, such as flash card or USB, or any other machine-readable storage medium, wherein, when the program code is loaded into and executed by a machine, such as a computer, the machine becomes an apparatus for practicing embodiments of the disclosure. The methods and apparatus of the present disclosure may also be embodied in the form of a program code transmitted over some transmission medium, such as electrical wiring or cabling, through fiber optics, or via any other form of transmission, wherein, when the program code is received and loaded into and executed by a machine, such as a computer, the machine becomes an apparatus for practicing and embodiment of the disclosure. When implemented on a general-purpose processor, the program code combines with the processor to provide a unique apparatus that operates analogously to specific logic circuits.

While the invention has been described by way of example and in terms of the preferred embodiments, it is to be understood that the invention is not limited to the disclosed embodiments. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A method for locally activating a DRM engine, applied to an electronic device, comprising:
    performing a preprocessing operation, wherein rights objects are bound with digital content files with a first format;
    converting the digital content files with the first format to the digital content files with a second format;
    encrypting the digital content files with the second format file and generating a corresponding decryption key;
    storing the encrypted digital content files and the decryption key in a memory device;
    designing an application to perform authorization, file decryption, DRM engine activation, and security control;
    installing the application on the electronic device;
    installing the memory device to the electronic device;
    authorizing the application according to the rights objects bound in the digital content files;
    the application decrypting the encrypted digital content files using the decryption key, wherein the digital content files with the second format is recovered from the third format;
    the application activating a DRM engine of the electronic device; and
    the DRM engine binding an IMEI code of the electronic device with the digital content files, enabling the digital content files to only be accessed by the specific electronic device.

2. The method for locally activating a DRM engine as claimed in claim 1, wherein the digital content files with a second format can only be recognized by the DRM engine of the electronic device.

3. The method for locally activating a DRM engine as claimed in claim 1, wherein the step of encrypting the digital content files further comprises converting the digital content files with the second format file to the digital content files with a third format file.

4. The method for locally activating a DRM engine as claimed in claim 1, wherein the decryption key is dispersedly stored in the memory device.

5. The method for locally activating a DRM engine as claimed in claim 1, wherein the rights objects is a verification code for the digital content files or a unique serial number of the memory device or the electronic device.

6. The method for locally activating a DRM engine as claimed in claim 1, further comprising converting the digital content files with the second format to the digital content files with a fourth format when the DRM engine is activated.

7. The method for locally activating a DRM engine as claimed in claim 1, wherein the digital content files with the second format file is decrypted if downloaded from a file server.

8. A system for locally activating a DRM engine, comprising:
    a memory device, providing a memory position to store digital content files encrypted using an encryption method and a decryption key; and
    an electronic device, providing an application and a DRM engine, wherein the application is design to perform authorization, file decryption, DRM engine activation, and security control,
    wherein when the memory device is installed to the electronic device, the application is authorized according to rights objects bound in the digital content files, and decrypts the encrypted digital content files using the decryption key, and wherein the digital content files with a first format is converted into a second format, and activates the DRM engine, the DRM engine converts the digital content files with the second format to the third format and binds an IMEI code of the electronic device with the digital content files, enabling the digital content files to only be accessed by the electronic device.

9. The system for locally activating a DRM engine as claimed in claim 8, wherein the decryption key is dispersedly stored in the memory device.

10. The system for locally activating a DRM engine as claimed in claim 8, wherein the rights objects is a verification code for the digital content files or a unique serial number of the memory device or the electronic device.

11. A non-transitory computer-readable medium encoded with computer executable instructions for performing a method for locally activating a DRM engine, wherein the computer executable instructions comprise:
    performing a preprocessing operation, wherein rights objects are bound with digital content files with a first format;
    converting the digital content files with the first format to the digital content files with a second format;
    encrypting the digital content files with the second format file and generating a corresponding decryption key;
    storing the encrypted digital content files and the decryption key in a memory device;
    designing an application to perform authorization, file decryption, DRM engine activation, and security control;

installing the application on the electronic device;
installing the memory device to the electronic device;
authorizing the application according to the rights objects bound in the digital content files;
the application decrypting the encrypted digital content files using the decryption key, wherein the digital content files with the second format is recovered from the third format;
the application activating a DRM engine of the electronic device; and
the DRM engine binding an IMEI code of the electronic device with the digital content files, enabling the digital content files to only be accessed by the specific electronic device.

12. The non-transitory computer-readable medium as claimed in claim 11, wherein the digital content files with a second format can only be recognized by the DRM engine of the electronic device.

13. The non-transitory computer-readable medium as claimed in claim 11, wherein the step of encrypting the digital content files further comprise converting the digital content files with the second format file to the digital content files with a third format file.

14. The non-transitory computer-readable medium as claimed in claim 11, wherein the decryption key is dispersedly stored in the memory device.

15. The non-transitory computer-readable medium as claimed in claim 11, wherein the rights objects is a verification code for the digital content files or a unique serial number of the memory device or the electronic device.

16. The non-transitory computer-readable medium as claimed in claim 11, further comprising converting the digital content files with the second format to the digital content files with a fourth format when the DRM engine is activated.

17. The non-transitory computer-readable medium as claimed in claim 11, wherein the digital content files with the second format file is decrypted if downloaded from a file server.

* * * * *